Feb. 2, 1937.    H. STARK    2,069,285
ORIENTATION DEVICE
Filed March 6, 1936    2 Sheets-Sheet 1

Inventor
Horace Stark

By Fisher and Pedersen
Attorneys

Feb. 2, 1937.  H. STARK  2,069,285
ORIENTATION DEVICE
Filed March 6, 1936  2 Sheets-Sheet 2

Inventor
Horace Stark
Fisher and Pedersen
Attorney

Patented Feb. 2, 1937

2,069,285

UNITED STATES PATENT OFFICE 2,069,285

ORIENTATION DEVICE

Horace Stark, Detroit, Mich.

Application March 6, 1936, Serial No. 67,543

7 Claims. (Cl. 33—204)

This invention relates to an orientation device particularly adapted for aircraft for determining the actual location of terrain or the relative positions of objects at a distance to assist in guiding the pilot in his course to an airport or for manoeuvring around an airport or other terrain without losing sense of direction.

Numerous devices have been developed which automatically indicate or mark out on a map or chart the course traveled from a starting point to a destination point. Such inventions are of practically no value whatever for aeronautical use, since with the present-day complement of regular flight instruments, radio beams, and radio compass, navigating a straight course from airport to airport under conditions of flyable weather is not at all difficult and comes under the classification of routine flying. The automatic pilot adds further to the simplification of such routine flying. Complications during flight begin, however, after passing the airport of destination and in circling around preparatory to bringing the plane in line with the runway to be used. At this time, the pilot is extremely occupied in making preparations for landing, such as lowering the landing gear, decreasing the air speed to the proper manoeuvring speed, changing the propellers back into low pitch, as well as maintaining a two-way radio conversation with the airport control tower and keeping in mind the position of other planes that are flying in the same vicinity. This requires practically the entire attention of a very experienced airline pilot. The problem of orientation, since it is constantly changing, particularly when in an actual turn, which, in fact, is actually most of the time, is therefore a great one.

Until recently, during blind flight, it was impossible to establish the plane's position, once the circling began, and it was only after going through a complicated flight manoeuvre of about 30 minutes, which plan changed with almost every airport, that the pilot was able to ascertain his position once more relative to the airport. The radio compass has assisted in solving this problem, but there still remained the complex problem of transposing the readings of this instrument and that of the gyro compass into a mental picture of the line of flight over that particular section of the country, in the direction of the airport, as well as to form the proper picture of the location of the airport and its runways, and so on, to this course.

One of the objects of my invention is to automatically produce a picture of the landing conditions by mechanical means so that the pilot will be unburdened of this difficult flight problem and therefore will be in a position to devote his attention to other considerations incident to the successful completion of the flight.

Another object of this invention is to provide a form of device particularly adapted for maintaining orientation between a map or chart and the terrain or field which said map or chart represents; that is, to maintain the map or chart so that its east side, north side, etc., lie toward the corresponding parts of the actual terrain or field during approach to the field or airport so that the pilot may know immediately from the map or chart the relation or relative positions of objects or parts of the field as they actually exist.

Another object of the invention is to provide an orientation device for assisting a pilot during flight in proximity to an airport in making a proper approach by assisting him in locating a particular runway of an airport on which he desires to land or which he has been instructed by radio information to use in the landing of the aircraft.

A further object of the invention is to provide a form of device by which a pilot may be assisted, particularly during fog or partial visibility, in the location of objects indistinctly visible such as a runway on an airport when only a part of it can be seen. This is accomplished by use of a chart showing the airport, etc., maintained oriented or aligned with the airport so that the position of objects on the airport may be known when vision of such is partly or dimly obscured.

With these and other objects in view the invention comprises the features and combinations as hereinafter more fully described and defined in the claims.

In the operation of commercial aircraft in which the aircraft is flown over a particular course from one terminus to another with the aid of a radio beam originating from a station located a substantial distance from the terminal flying field, it frequently happens that a pilot, when nearing the field and particularly in circling around the field preparatory to making a proper approach, based on instructions received by radio, loses his sense of direction and in referring to a chart or map of the field a considerable time is required before he can position a map or chart in the right direction so as to regain his sense of direction. After the pilot once becomes confused it is exceedingly difficult, in view of his rate of travel around or in proximity to the field, for him to get located or oriented, and frequently it results in serious traffic "tie-ups". The attendant mental strain makes proper landing difficult.

With the aid of the device hereinafter described, the pilot is enabled to locate immediately the position or lay of the field and can, by the assistance of the chart maintained in oriented position, locate immediately the runway which he is to use and can get the airplane into position for making the proper approach for landing.

This device is also of very considerable assistance in determining the drift during flight since by the use of the radio compass he is kept informed of the direction of the known location of the radio station and the gyroscopically oriented chart will indicate the number of degrees which the plane has deviated at any given time from the desired course. The pilot may then make corrections in his flight so as to get back on the desired course, at which time the radio beam and the course line on the chart will be in alignment.

In the device of my invention, I employ a circular chart which is preferably only a few inches in diameter and which is made up for the airport of destination and which is directly attached to a gyroscope means. In this manner, the small, light chart is made a part of a neutrally mounted directional gyroscope of the usual form having three degrees of freedom with its spin axis normally horizontal, and by being properly balanced it does not interfere with the normal, proper operation of this extremely sensitive instrument. In use, the gyroscope is set, by reference to the magnetic compass, at a point or heading corresponding to geographical north and in this manner the pilot, through use of my invention and upon bringing the flight instruments and the radio compass to central or neutral positions, has an exact mechanical reproduction of the location of the radio beams, airways, position of the airport to these, and so forth, and, regardless of the number of times or in what manner the course is changed around or at what angle to the airport the aircraft is temporarily, this exact orientated picture is reproduced on a small scale in a form corresponding with the orientation of things below the plane.

Various advantages in the use of the device of my invention and the detailed mode of operation will be clear from a detailed description in connection with the drawings showing the preferred embodiment of the invention and a modification thereof, in which.

Figure 1:
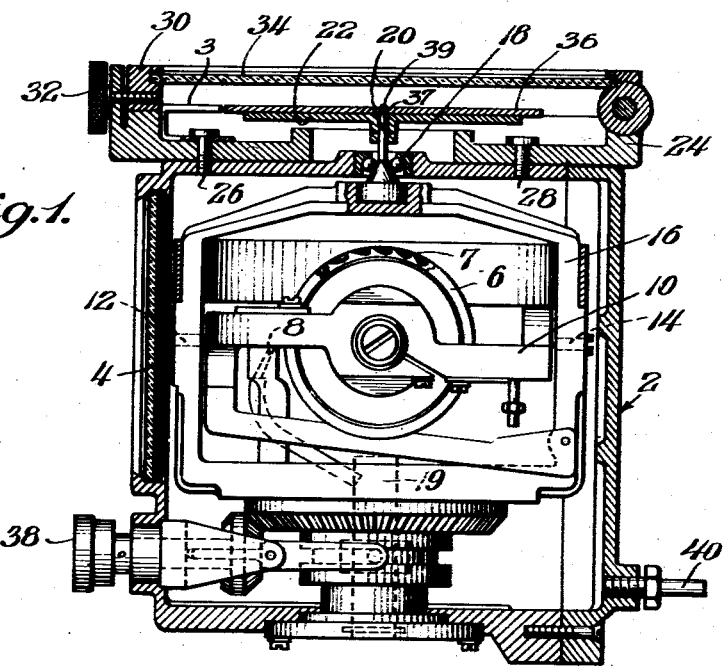
Fig. 1 is a vertical sectional view showing the preferred form of the said invention.

Referring more in detail to the drawings, 2 designates a casing or housing for the gyroscope having a front window 4 in which the usual compass card is visible. Within the housing is mounted the usual gyro-rotor member 6 having buckets or projections 7 by which the gyro is rotated by means of air from the usual air nozzles 8. The said gyro-rotor is pivotally mounted in the usual horizontal rotor bearing ring 10 which bearing ring is in turn pivotally supported by pivot members 12, 14 in a vertical ring 16 which is also suitably mounted in bearings as 18, 19 so as to permit free oscillating movement. Connected to the vertical ring is a shaft member 20 which is attached to the said vertical ring so as to oscillate or turn with the said vertical ring, the said shaft member being preferably integral with the said vertical ring, although it may obviously be directly attached thereto in any desired manner. Mounted on the said shaft or rod is a disk member 22 which is maintained within a casing 24 above the gyroscope casing or housing 2, being connected to the rod 20 so as to oscillate or move therewith. The said casing 24 is connected in any suitable manner as by means of screws 26, 28 to the casing 2 so as to be readily assembled or dismounted as may be desired. The said casing 24 has a cover member 30 which may be suitably locked in position by means of a set screw 32 and has a cover glass or transparent member 34 in the upper portion thereof so that the said chart or map 36 mounted on the disk member 22 will be readily visible therethrough.

The said chart or map 36 may be of any suitable form but is preferably circular and of uniform thickness so that in mounting the same on the said disk there will be no unbalanced force tending to cause recessional movement or deviation in the gyroscope. The chart may be obviously made integral however with the disk or support 22 if desired.

The part 38 represents the usual setting knob by means of which the gyroscope may be locked about its horizontal axis or to rotate the gyroscope about its vertical axis through a pinion and gear as shown. The part 40 represents the coupling or connection by means of which air is exhausted in order to maintain a suitable vacuum within the gyroscope casing.

Figure 2:
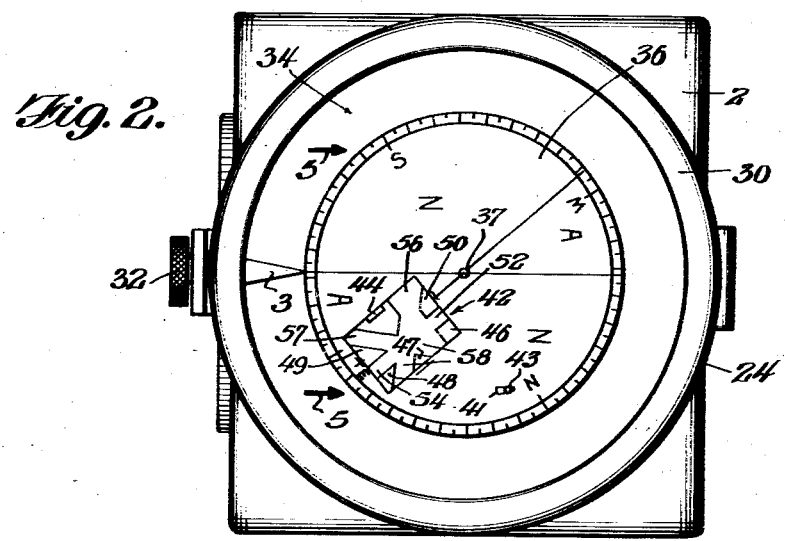
Fig. 2 is a top or plan view of the device showing a chart of an airport in adjusted position.

The chart 36 as shown more particularly in Fig. 2 preferably contains the marks N, S, E and W indicating the geographical directions, so that when the card is mounted in place and the gyroscope is in operation, this card will be set so that the part representing north will point exactly north and so that the airport field represented by the rectangle 42 will be in alignment with or parallel with the actual field at all times provided, of course, that the proper correction is made during flight, such correction being generally made at about twenty minute intervals so as to allow for the usual gradual deviations of the gyroscope.

The numeral 42 indicates a flying field, for example, on which the part 44 represents an object, such as the administration buildings, whereas parts 46, 47, 48, 49 and 50 represent terrain unsuitable for landing. The free space between numerals 52—54 represents one runway, for example, and spaces 56—58 and 57—58 represent other runways at an angle to the first runway.

It will be understood that in circling the field or in manoeuvring about the field to attain the proper point of approach the chart of the field remains parallel to the actual field so that even though parts are obscured or only partly visible, the position of the runways and other parts of the field will be immediately known by reference to the chart without the necessity of turning or twisting the map during flight, as was heretofore necessary to obtain the necessary information before initiating the landing of the aircraft.

Figure 3:
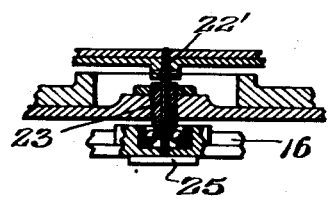
Fig. 3 is a modified form of attached means for connecting the chart disk to the vertical ring of the gyroscope whereby the chart is maintained in oriented position during the operation.

It will be understood that instead of mounting the chart on a disk, the charts may be directly attached to a disk so that it is necessary only to make a proper connection as indicated in Fig. 3 of the drawings. Furthermore, instead of using the form of mounting for the chart shown in Fig. 1, the chart may be attached by means of a rod member 22' which passes downwardly through a screw connection 23 and is attached to the vertical ring member 16 by means of a connection 25 attached to the said ring. In the preferred construction, however, the said charts or cards are mounted on the d'sk by means of a center opening 37 in the chart or disk which engages a pin 39 and an opening 41 which passes over a projection 43 in the form of a bayonet joint, for example.

In the use of the device it will be understood that the pilot before beginning his flight will attach or connect the proper chart for the terminal field and when the gyroscope is put into operation it will be properly oriented at the start, so that the field chart is in alignment or oriented with the actual field so that the actual position of the various runways and objects on the field will be known at all times.

Figure 4:
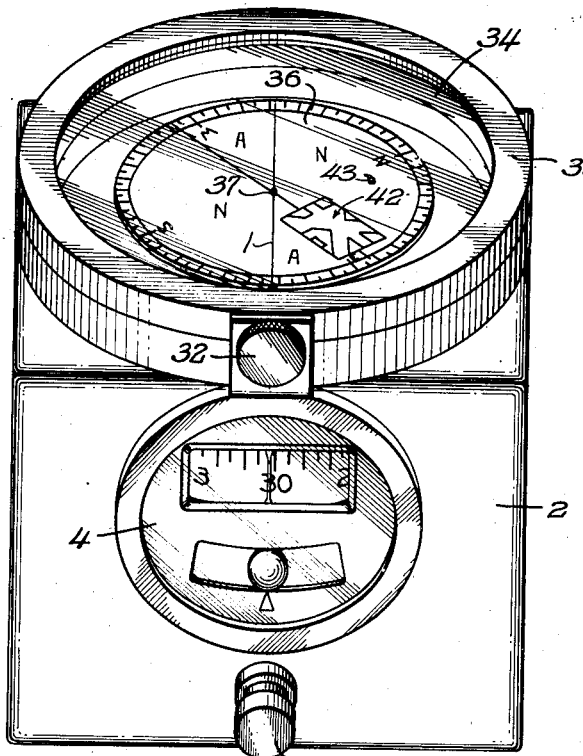
Fig. 4 is a front view in perspective of the orientation device as it appears when mounted in the cockpit of the airplane.

In order to illustrate the manner of use of the invention, it may be assumed that a flight is to be made from the airport of Washington, D. C., to Pittsburgh, Pennsylvania. A chart of the Pittsburgh landing field is, first inserted in the orientation device by unscrewing the knob 32 (Fig. 4), and inserting the Pittsburgh field chart (Fig. 5) in place.

Figures 5, 6:
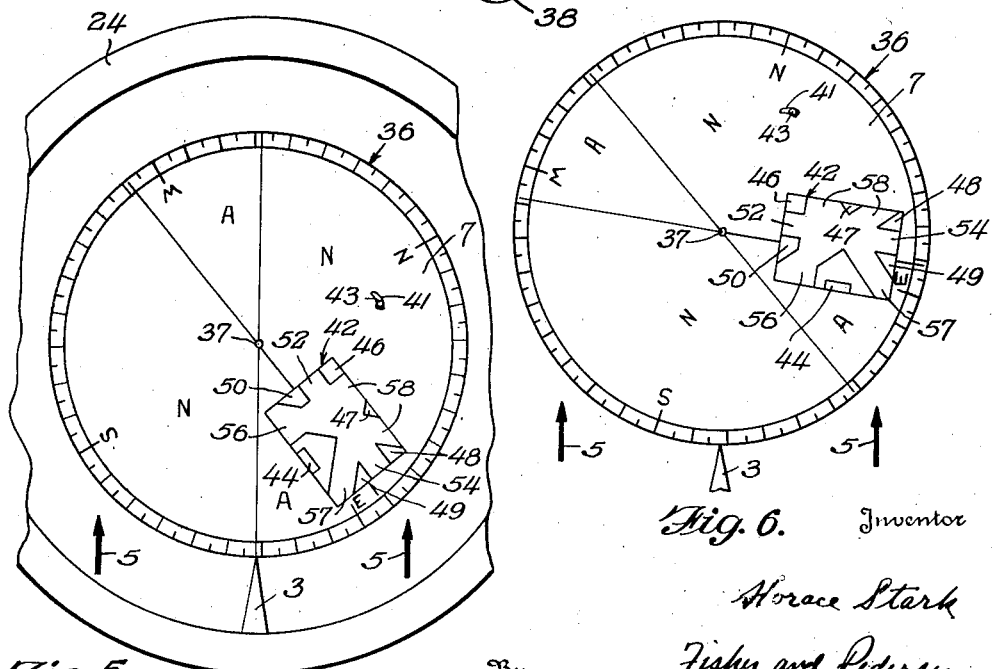
Fig. 5 is a view of the chart as it appears in the orientation device when the aircraft is following the flight route.
Fig. 6 is a view of the chart as it appears to the pilot in one position when the aircraft is turning or circling to the right or in a clockwise direction from the position indicated in Fig. 5 of the drawings.

Referring to Fig. 5, the course line 1 from Washington, D. C., to Pittsburgh, Pennsylvania, is set by adjustment of the directional gyroscope to geographical north, which action turns the card 36 in a manner that aligns this course line 1 with the course indicator or pointer 3, as illustrated. When within about 25 miles of the airport destination, the pilot contacts the airport control tower at this point (at 37), and receives information relative to the direction and velocity of the prevailing ground wind, the field barometric pressure, etc., expected arrival time of other planes and the position of those already within the airport area.

By reference to chart 36 which shows four runways or eight possible directions in which to make a landing, depending upon the direction of the wind, it can readily be seen that simplification of the whole airport flight problem is accomplished by reference to this chart. For example, if the wind is SW 20 miles per hour, the pilot will make the landing into the southwest using runway 56, 58 and he can easily and quickly locate the direction of this runway by merely referring to a southwesterly direction on the chart. The angle this forms with the course being flown will determine the final manoeuvre made prior to the landing. When within some five miles or so from the airport, it only remains to change the course to the right for a few minutes, after which a left turn is made to bring the plane in line with the runway used.

The position of the chart of Fig. 6 illustrates what is observed by the pilot upon changing the course to the right from the straight heading 1 of Fig. 5. At this time, the "off course" arrow 5 on the right, corresponding to a deviation in course in that direction, shows the exact angle to the airport, or direction in which the plane is traveling toward the airport, radio beams, etc. In the case of arrival at an airport having a radio beam, as the airport at Pittsburgh, Pennsylvania, illustrated, it is a relatively simple matter to check very definitely the exact position of the plane by noting the direction in which it is traveling and the passing from one radio quadrant 7 to another.

Upon bringing the flight instruments and the radio compass to central or neutral positions, the pilot has an exact mechanical reproduction of the location of the radio beams, airways, position of the airport to these, and so forth, exactly as they are positioned in relation to his location at the time and the course in which he is traveling, and nothing more on the part of the pilot becomes necessary to effect this. It is then a simple matter, having located the proper runway to land the aircraft in the usual manner.

It will be apparent that the device will be an aid in following the proper course, the radio compass serving as a check on the straight course to be flown indicated by the line 1 on the chart which coincides with the course pointer 3 when the straight course is being followed.

The orientation device of my invention will assist during ordinary flight in making proper corrections due to drift which will be directly apparent from the fact that the course line 1 of the chart (Fig. 5) does not coincide with the neutral reading of the radio compass and proper corrections in flight may then be made.

A valuable feature of this chart is its usefulness in providing a means for readily locating and keeping check on the position of other aircraft that are in the same locality. For illustration, if the position of a plane is given as northwest of the airport, another northeast of the airport, and the present position of the plane being flown is southeast of the airport, it is only necessary to keep in mind that one plane is one-quarter of a circle ahead at all times, and the other is one-half a circle ahead, since all turns are made to the left and at an approximately uniform diameter and average speed.

The device will also be of inestimable value for pilots in approaching unfamiliar airports for landing by which the pilot will not lose his sense of direction and will, therefore, greatly increase the factor of safety in landing.

It will be obvious that the details of construction of the gyroscope may be varied as may be desired and that the form of gyroscope illustrated is more or less conventional in form. It should be understood, however, that the device of my invention would not operate in connection with the ordinary magnetic compass for the reason that when circling in the neighborhood of an airport or when diverging to any substantial amount from a given direction of flight, the compass card or needle oscillates to such an extent that the true northerly direction cannot be ascertained. Furthermore, in a banking turn of any substantial extent the magnetic compass becomes locked and is inoperative, therefore, for the purpose of giving directions at the particular time, when in accordance with the purpose of this invention it is most needed. It should be further stated that after such turning manoeuvres, when level flight is again resumed, it requires in general substantially five minutes and even longer before directions may be obtained by reference to the magnetic compass. It should be recognized, therefore, that operation of the orientation device of this invention is limited to the use of a gyroscope and does not apply or operate with a magnetic compass or any other form of compass as far as applicant is aware.

It will be understood that various changes or modifications may be made in the device as illustrated and described without departing from the spirit or scope of the invention as defined in the annexed claims.

Having thus described the invention, what I claim as new is:

1. An orientation device for aircraft adapted for directly locating the direction of objects at a terminus and to assist in flying a predetermined course to a terminus which comprises a neutrally mounted gyroscope having three degrees of freedom with its spin axis normally horizontal, a chart showing objects in their relative dimensions and positions at a terminus, and means connecting said chart and gyroscope to maintain a desired orientation of said chart during landing.

2. An orientation device for aircraft adapted for directly locating the direction of objects at a terminus so as to maintain orientation or sense of direction in manoeuvring around the terminal airport to obtain a proper position for effecting a landing which comprises a neutrally mounted gyroscope having three degrees of freedom with its spin axis normally horizontal and having the usual rotor and horizontal rotor bearing ring supported in a vertical ring mounting, a vertical ring, a chart showing runways or other objects at the terminus in scaled dimensions and relative positions directly attached to the said vertical ring of the said gyroscope to be stabilized therewith, means for setting the said gyroscope and means for spinning the said gyroscope rotor during flight.

3. An orientation device for aircraft comprising a gyroscopic mechanism having a vertical ring, a chart showing objects in their relative positions directly attached to said vertical ring of the gyro by connections permitting the said chart to be maintained in a horizontal position easily accessible to the pilot for reference, and means permitting the said chart to be readily attached or detached without affecting the operation of the gyroscope.

4. An orientation device adapted for aircraft for immediately locating runways or objects on a flying field at a terminus during flight and for other similar purposes which comprises a neutrally mounted gyroscope having three degrees of freedom and comprising an air spun gyro rotor, a horizontal rotor bearing ring, means for mounting said rotor therein for spinning about a normally horizontal axis, a vertical carrying ring, means for pivotally mounting said horizontal ring on said vertical ring for oscillation about a horizontal axis normal to said rotor axis, vertical bearings for mounting said vertical ring for movement about a normally vertical axis, means for detachably mounting a chart for operation with said vertical carrying ring in a balanced substantially horizontal position, said chart showing the location of objects in their relative positions, means for orienting the gyro and chart and means maintaining the said chart during operation of the gyro in a protected visible position.

5. An orientation device for aircraft adapted for immediately locating runways or objects on a flying field or other terrain during flight which comprises a neutrally mounted gyroscope having three degrees of freedom and comprising an air spun gyro rotor, a horizontal rotor bearing ring, means for mounting said rotor therein for spinning about a normally horizontal axis, a vertical ring, means for pivotally mounting said horizontal ring on said vertical ring for oscillation about a horizontal axis normal to said rotor axis, vertical bearings for mounting said vertical ring for movement about a normally vertical axis, means for mounting a disk member in a substantially horizontal plane on said vertical ring so as to rotate with movements of the said vertical ring, means for rigidly mounting a chart on said disk, said chart bearing lines showing the location of runways and other objects of a known flying field whereby the chart is maintained in orientation with the terrain at a terminus, and means for orienting the gyro and chart.

6. An orientation device for aircraft adapted for directly locating the direction of objects at a terminus during flight and to assist in flying a predetermined course over an airway to a terminus and also for maintaining sense of direction in manoeuvring to a proper position for effecting a landing which comprises a neutrally mounted gyroscope having three degrees of freedom with its spin axis normally horizontal, said mounting including the usual vertical ring member, a chart showing runways and other objects in their relative dimensions and positions at a terminus and means directly connecting said chart to the said vertical ring of the gyroscope, means for setting the said gyroscope and said chart for operation as a unit about the vertical axis of said vertical ring to maintain during flight a true direction of the objects shown on said chart and means for operating the said gyroscope.

7. An orientation device for aircraft adapted for directly locating the direction of objects at a terminus and to assist in flying a predetermined course to a terminus which comprises a gyroscope having a rotor, a chart showing objects in their relative dimensions and positions at a terminus, means directly attaching the said chart to the said gyroscope to operate therewith to maintain orientation, means for spinning said rotor whereby the chart is maintained in set azimuthal position, said rotor and chart being balanced about all axes whereby precession and wandering are substantially obviated, a casing enclosing said gyroscope and chart whereby the chart is maintained under partial vacuum as air is exhausted from said casing.

HORACE STARK.